May 8, 1962 C. E. RACKLYEFT 3,032,954
SUCTION CLEANER
Filed Nov. 20, 1959 2 Sheets-Sheet 2
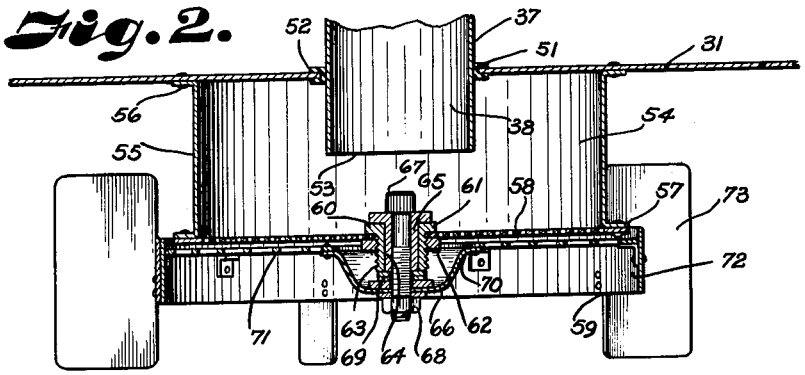
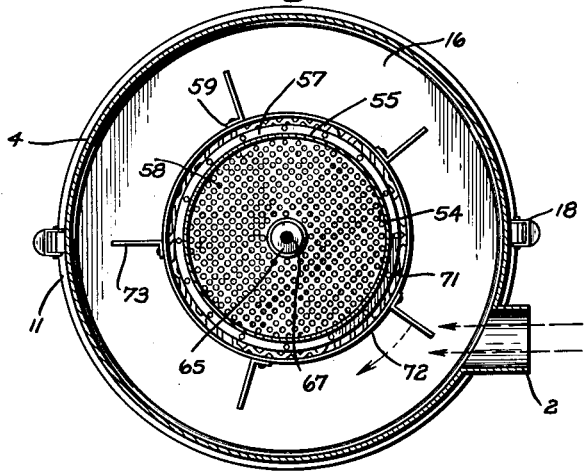
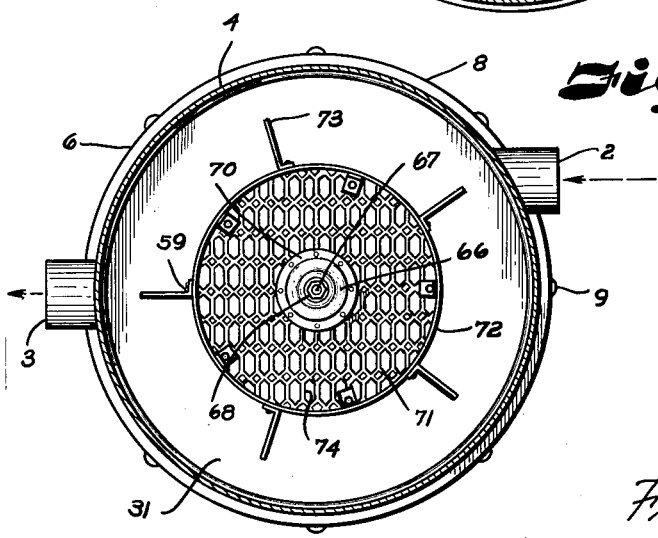
INVENTOR.
Carl E. Racklyeft.
BY
Fishburn and Gold
ATTORNEYS.

United States Patent Office 3,032,954
Patented May 8, 1962

3,032,954
SUCTION CLEANER
Carl E. Racklyeft, %Thermo-Dynamics Corporation,
P.O. Box 1708, Ponca City, Okla.
Filed Nov. 20, 1959, Ser. No. 854,325
4 Claims. (Cl. 55—282)

This invention relates to suction cleaners, and more particularly to improvements in suction cleaners for cleaning rooms in buildings wherein dirt, dust and the like are conveyed by suction to a central separating and collecting station from which air is discharged exteriorly of the building.

In central cleaning systems of the suction or vacuum types, ducts extend through the walls of a building from the various rooms to a central dirt collecting station, and when a room is to be cleaned, a suction cleaning implement is connected by a flexible hose to an inlet of a duct leading to said room, and a suction apparatus draws air through the cleaning implement and conveys dirt, dust and the like therewith to a separator chamber. The air is usually drawn from the separator chamber through a screen by the suction apparatus and is discharged exteriorly of the building. Relatively lightweight items such as paper tissue, stockings and other foreign material which are too large to pass through the screen are frequently drawn through the ducts to the separator chamber and become deposited upon the screen or filter, reducing or substantially stopping the flow of air therethrough, and thereby reducing or interrupting the suction applied to the cleaning implement. Also, water or other liquids may be drawn through the cleaning implement and ducts to the separator chamber and collect therein or pass through the screen to the suction apparatus in such quantity as to interfere with efficient operation of the cleaner.

The principal objects of the present invention are to provide a suction cleaner with a dirt separator structure that eliminates the above-mentioned difficulties; to provide such a suction cleaner with a dirt separator wherein air flow into the separator actuates a rotor to provide a centrifugal action that breaks up particles of liquids and substantially vaporizes same and effects a centrifugal or whirl action facilitating the separation of the heavier than air particles from the air stream passing to the suction apparatus; to provide such a cleaner wherein the separator has a self-cleaning air filter or screen at the passage from the dirt-collecting chamber to the suction apparatus; to provide a suction cleaner with a separator having an air inlet and a rotor having vanes positioned whereby entering air impinges on said vanes and rotates said rotor to effect a centrifugal movement of the air and particles carried thereby; to provide such a separator with a relatively movable screen and a rotor with a perforate member in said rotor in close proximity to the screen whereby said relative movement of the rotor and screen grinds or otherwise reduces the size of objects tending to be deposited on the screen and thereby prevents interruption of the air flow to the suction apparatus; and to provide a suction cleaning apparatus with a dust separator having a screen structure that is automatically and continuously cleaned for continued efficient operation over long periods of time.

Other objects and advantages of this invention will become apparent from the following description taken in connection with the accompanying drawings wherein are set forth by way of illustration and example certain embodiments of this invention.

FIG. 2 is an enlarged vertical sectional view through the rotor and screen at the passage from the collecting chamber to the suction apparatus.

FIG. 3 is a horizontal sectional view through the separator on the line 3—3, FIG. 1.

FIG. 4 is a horizontal sectional view through the separator on the line 4—4, FIG. 1.

Figure 1:
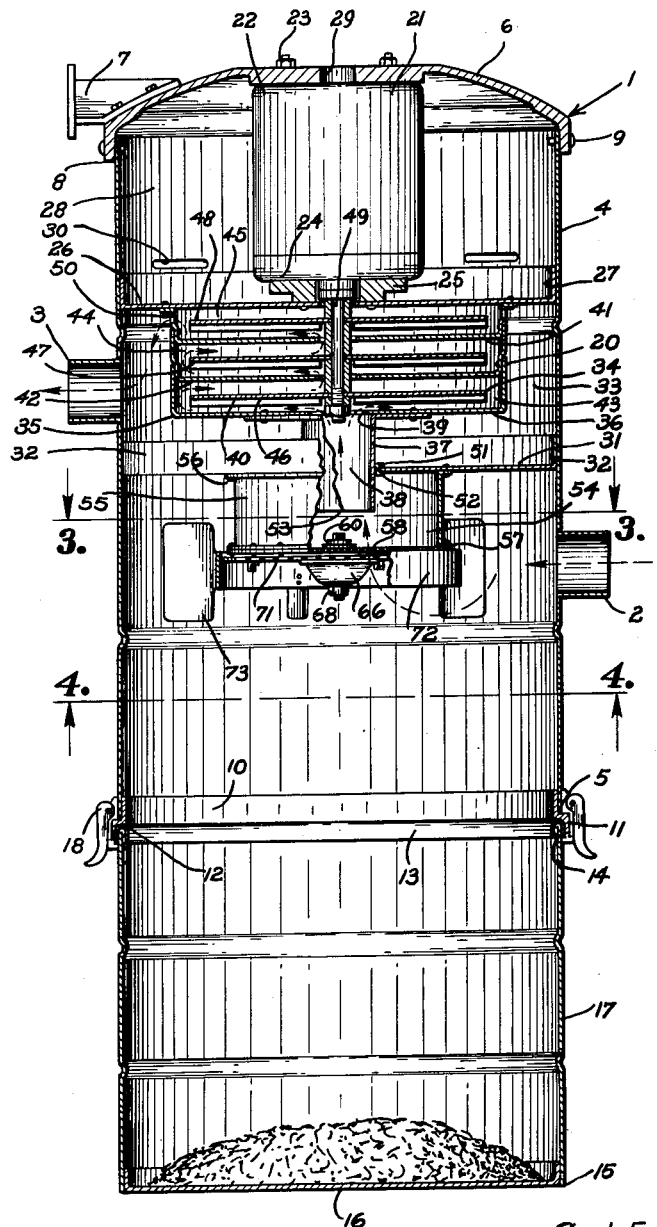
FIG. 1 is a view in vertical section partly in elevation of a combined suction producing dirt separating and collecting unit for use in central cleaning systems.

Referring more in detail to the drawings:

1 generally designates a combined suction producing, dirt separating and collecting unit adapted to be used in a central cleaning system of a building wherein ducts (not shown) extend from suction cleaning implement connections in various rooms through the walls of the building and are suitably connected in communicating relation with an inlet 2 for delivery of dirt, dust and other material to the unit 1, as later described. The unit 1 has an air outlet 3 suitably connected to a duct (not shown) for discharging air exteriorly of the building. The combined suction producing, dirt separating and collecting unit 1 includes a preferably cylindrical casing 4 of suitable metal open at its bottom 5 and closed at its upper end by a top wall or cover 6.

It is preferable that the cover 6 be of strong wall construction whereby the unit is supported in suspended relation therefrom and that a bracket or other mounting member 7 extend from said cover and be adapted to be secured to a wall or the like whereby the unit is spaced from walls, ceiling and floor of the space in which it is positioned.

The cover member 6 is preferably dome-shaped and has depending flanges 8 secured by suitable fastening devices 9 to the upper portion of the cylindrical casing 4. The lower end or bottom portion 5 of said casing has a reinforcing peripheral ring 10 suitably secured thereto with an offset depending peripheral flange 11 forming a shoulder 12 adapted to be engaged by a resilient seal member 13 on the upper edge 14 of a cylindrical dust-collecting pan or receptacle 15 adapted to be detachably connected to the lower end of the casing 4 in closing relation thereto.

The pan or receptacle 15 has a bottom wall 16 suitably secured to the cylindrical side walls 17 to form a pan of large capacity and substantial depth. A plurality of suitable fastening devices 18 are arranged around the lower end of the casing 4 and upper end of the wall 17 for cooperation in removably securing the pan 15 to the casing 4 whereby said pan substantially forms a downward extension of said casing 4.

A suitable suction blower apparatus 20 is arranged in the upper portion of the casing 4 and includes a motor 21 arranged substantially axially of said casing with its upper end 22 secured to the cover 6 by suitable fastening devices 23. The lower end 24 of said motor is connected to a plate 25 carried by a horizontal or transverse wall 26 which has a peripheral flange 27 suitably secured to the shell 4 whereby the shell 4, cover plate 6 and wall 26 cooperate to define a motor chamber 28. The cover member 6 preferably has an opening 29 therein for movement of air to the motor for cooling same, said air being discharged through apertures 30 in the shell 4 above the wall 26 whereby the motor is cooled by circulation of air independently of the air drawn through the cleaning apparatus.

A second horizontal or transverse wall 31 has a peripheral flange 32 suitably secured to the shell 4 in downwardly spaced relation to the wall 26 whereby the shell and walls 26 and 31 define a chamber 33 in which a centrifugal suction pump or blower 34 is located. In the structure illustrated, the pump 34 is of the three-stage type having a housing 35 with the lower wall 36 thereof having a tubular axial extension 37 defining a passage 38 communicating through an inlet opening 39 with the first stage 40 of said pump. The pump housing has spaced partitions 41 and 42 cooperating with the top and bottom walls of the pump to define pump chambers 43, 44 and 45 in which are located impellers 46, 47 and 48 respectively carried on a motor shaft 49 whereby operation of the motor 21 drives the impellers and draws air through the passage 38 and discharges the air from the pump through outlets 50 into the chamber 33. The outlet or air discharge connection 3 has communication with the chamber 33 whereby the air discharged from the pump passes through the connection 3 to an air discharge duct (not shown).

The tubular member 37 extends through an opening 51 in the wall 31 with the marginal edge defining said opening being provided with a resilient seal member 52 which engages said tube 37 to form a seal between said wall 31 and member 37. The lower end of the tube 37 terminates as at 53 in a filter chamber 54 defined by a circular ring member 55 arranged axially of the shell 4 and having its upper end secured as at 56 to the wall 31 and its lower end provided with a flange 57 to which is secured a perforate screen member 58 in covering relation to the opening at the lower end of said filter chamber. A rotor 59 is rotatably mounted on a bearing 60 arranged axially of the tubular member 37 and carried by the screen member 58. The bearing member 60 has a flanged upper end 61 that engages the upper surface of the screen member 58 and is held in engagement therewith by a nut 62 threaded on a threaded shank 63 that extends downwardly through the screen 58. The bearing member has a bore 64 in which is rotatably mounted a shaft 65 to which a hub 66 of the rotor is secured by a bolt 67 and nut 68, as illustrated in FIG. 2. Suitable washers 69 are positioned between the hub and the end of the bearing member 60. The hub 66 is dish-shaped and has a flange 70 to which is secured a perforate metal member or disc 71 preferably formed of expanded metal and arranged in a horizontal plane in close proximity or immediately adjacent to the screen 58. A peripheral ring 72 is secured to the outer peripheral portion of the member 71 and radially extending vanes 73 are suitably secured to the ring 72 with the ring and vanes being spaced outwardly from the flange 57 to provide clearance for rotation. The inlet connection 2 is arranged in a line substantially tangentially of the rotor 59, as illustrated in FIG. 3, whereby air and material carried thereby impinges against the vanes 73 rotating said rotor 59.

In operating a cleaning system having a combined suction producing, dirt separating and collecting unit constructed as illustrated and described and with the inlet connection 2 connected to ducts leading to various rooms of a building and a discharge duct connection 3 connected with ducts leading to the exterior of a building, a suitable cleaning implement is connected to the duct in a room to be cleaned, and then the motor 21 is energized to drive the suction pump creating an air flow therethrough and providing a suction at the cleaning implement whereby dirt and air are drawn through the implement and the ducts to the connection 2 and then the dirt-laden air enters the unit below the wall 31 in the whirl chamber portion of the separator and dirt collecting unit. The air passing through the connection 2 impinges on the vanes 73 rotating the rotor 59, and dirt carried by the air is thrown outwardly and given a whirling action. Also, any liquids such as water and the like that are drawn through the cleaning implement impinge on the vanes 73 which disperses and breaks up the droplets into a fine vapor or mist that will pass with the air to the discharge. As the air is whirled in the whirl chamber portion, the heavier particles of dirt and the like drop into the pan 15 and collect on the bottom 16. The air at the axial center of the chamber below the rotor is drawn through the perforate member 71 and screen 58 into the filter chamber 54 and in through the tubular member 37 to the suction pump 34 and is discharged through the openings 50 to the chamber 33 and then through the outlet connection 3 and discharge duct to the exterior of the building.

In the event paper tissues or other lightweight material of substantial size is drawn through the ducts to the separator, some will tend to be thrown outwardly and dropped to the bottom of the collecting chamber. However, in the event such material as paper tissues and the like are drawn upwardly with the air flow through the screen, such material will be deposited on the under surface of the rotor portion 71, and drawn through the openings 74 into engagement with the lower surface of the screen 58 and the relative movement of the rotor disk 71 and screen provides a grinding or reducing action on such paper tissues and the like reducing them in size whereby they can freely pass through the openings in the screen 58 and be discharged to the exterior of the building with the air discharge. This operation prevents the accumulation or retention of such sheet material over the screen 58, and thereby eliminates the possibility of such sheet material stopping the air flow and interrupting the suction to the cleaning implement. This structure maintains efficient operation whereby the apparatus is substantially trouble-free and needs to be serviced only when a large quantity of dirt and the like is collected in the pan 15 at which time the fastening devices 18 are released and the pan removed and dumped and then resecured to the bottom of the shell 4, and the unit is again ready for cleaning operations.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. A suction cleaner comprising, a substantially cylindrical casing having a closed upper end and an open lower end, a separable dirt collecting receptacle closing said lower end of the casing and adapted to collect dirt from dirt-laden air entering said casing, a suction blower means mounted in the upper portion of said casing, said suction blower means having an inlet duct extending downwardly therefrom, an outlet duct communicating with said suction blower means whereby operation of the suction blower means draws air through the inlet duct and discharges said air through said outlet duct, a ring member supported in coaxial relation with said inlet duct with an open lower end extending below said inlet duct, a perforate screen member covering said open end of said ring member, a rotor including a perforate disc member, means rotatably mounting said rotor with the axis of rotation thereof axially of said ring member and with said perforate disc member immediately adjacent and parallel to said perforate screen member, means defining vanes on said rotor extending outwardly therefrom, and means defining an inlet passage into said casing directed substantially tangentially of said rotor whereby air passing through said inlet passage impinges on said vanes causing said rotor to rotate and to direct air outwardly and circumferentially in said casing for gravitational settlement of heavier than air particles to the receptacle, said rotor and screen cooperating in their relative rotation to reduce any particles adhering thereon and eliminate interruption of air flow therethrough.

2. A suction cleaner comprising, a substantially cylindrical casing having a closed upper end and an open lower end, a separable dirt collecting receptacle closing said lower end of the casing and adapted to collect dirt from dirt-laden air entering said casing, a suction blower means mounted in the upper portion of the casing, said suction blower means having an inlet duct extending downwardly therefrom, a partition below said suction blower means surrounding said inlet duct to define a discharge chamber thereabove, said casing having an outlet duct communicating with said discharge chamber whereby operation of the suction blower means draws air through the inlet duct and discharges said air through the discharge chamber and outlet duct, a ring member depending from said partition in coaxial relation with said inlet duct with an open lower end extending below said inlet duct, a perforate screen member covering said open end of said ring member, a rotor including a perforate disc member, means rotatably mounting said rotor with the axis of rotation thereof axially of said ring member and with said perforate disc member immediately adjacent and parallel to said perforate screen member, means defining vanes on said rotor extending outwardly therefrom, and means defining an inlet passage into said casing directed substantially tangentially of said rotor whereby air passing through said inlet passage impinges on said vanes causing said rotor to rotate and to direct air outwardly and circumferentially in said casing for gravitational settlement of heavier than air particles to the receptacle, said rotor and screen cooperating in their relative rotation to reduce any particles adhering thereon and eliminate interruption of air flow therethrough.

3. A suction cleaner comprising, a substantially cylindrical casing having a closed upper end and an open lower end, a separable dirt collecting receptacle closing said lower end of the casing and adapted to collect dirt from dirt-laden air entering said casing, a partition fixed in the upper portion of the casing and cooperating with the closed upper end to define a motor chamber therebetween, a suction blower means mounted in the casing below said partition, means drivingly connecting the motor to the suction blower means, said suction blower means having an inlet duct extending downwardly therefrom, a second partition below said suction blower means surrounding said inlet duct and cooperating with the first-named partition to define a discharge chamber therebetween, said casing having an outlet duct communicating with said discharge chamber whereby operation of the suction blower means draws air through the inlet duct and discharges said air through the discharge chamber and outlet duct, a ring member depending from the second partition in coaxial relation with said inlet duct with an open lower end extending below said inlet duct, a perforate screen member covering said open end of said ring member, a rotor including a perforate disc member, means rotatably mounting said rotor with the axis of rotation thereof axially of said ring member and with said perforate disc member immediately adjacent and parallel to said perforate screen member, a peripheral rim on said rotor depending from said perforate disc, means defining vanes on said rotor extending outwardly from said rim thereof, means defining an inlet passage into said casing directed substantially tangentially of said rotor whereby air passing through said inlet passage impinges on said vanes causing said rotor to rotate and to direct air outwardly and circumferentially in said casing for gravitational settlement of heavier than air particles to the receptacle, said rotor and screen cooperating in their relative rotation to reduce any particles adhering thereon and eliminate interruption of air flow therethrough.

4. A suction cleaner comprising, a casing having a closed upper end and an open lower end, a dirt collecting receptacle closing said lower end of the casing and adapted to collect dirt from dirt-laden air entering said casing, a suction blower means in the upper portion of said casing, said suction blower means having an inlet duct extending downwardly therefrom, an outlet duct communicating with said suction blower means whereby operation of the suction blower means draws air through the inlet duct and discharges said air through said outlet duct, a ring member with an open lower end surrounding and extending below said inlet duct, a perforate screen member covering said open end of said ring member, a rotor including a perforate disc member, means rotatably mounting said rotor with the axis of rotation thereof axially of said ring member and with said perforate disc member immediately adjacent and parallel to said perforate screen member, means defining vanes on said rotor, and means defining an inlet passage into said casing directed substantially tangentially of said rotor whereby air passing through said inlet passage impinges on said vanes causing the rotor to rotate and to direct air outwardly and circumferentially of said casing for gravitational settlement of heavier than air particles to the receptacle, said rotor and screen cooperating in their relative rotation to reduce any particles adhering thereon and eliminate interruption of air flow therethrough.

References Cited in the file of this patent
UNITED STATES PATENTS

| | | |
|---|---|---|
| 1,450,501 | Hull | Apr. 3, 1923 |
| 1,701,782 | Kogstrom | Feb. 12, 1929 |
| 1,762,028 | Phelps | June 3, 1930 |
| 2,143,144 | Fagerberg | Jan. 10, 1939 |
| 2,171,248 | Van Berkel | Aug. 29, 1939 |